United States Patent Office 3,118,037
Patented Jan. 14, 1964

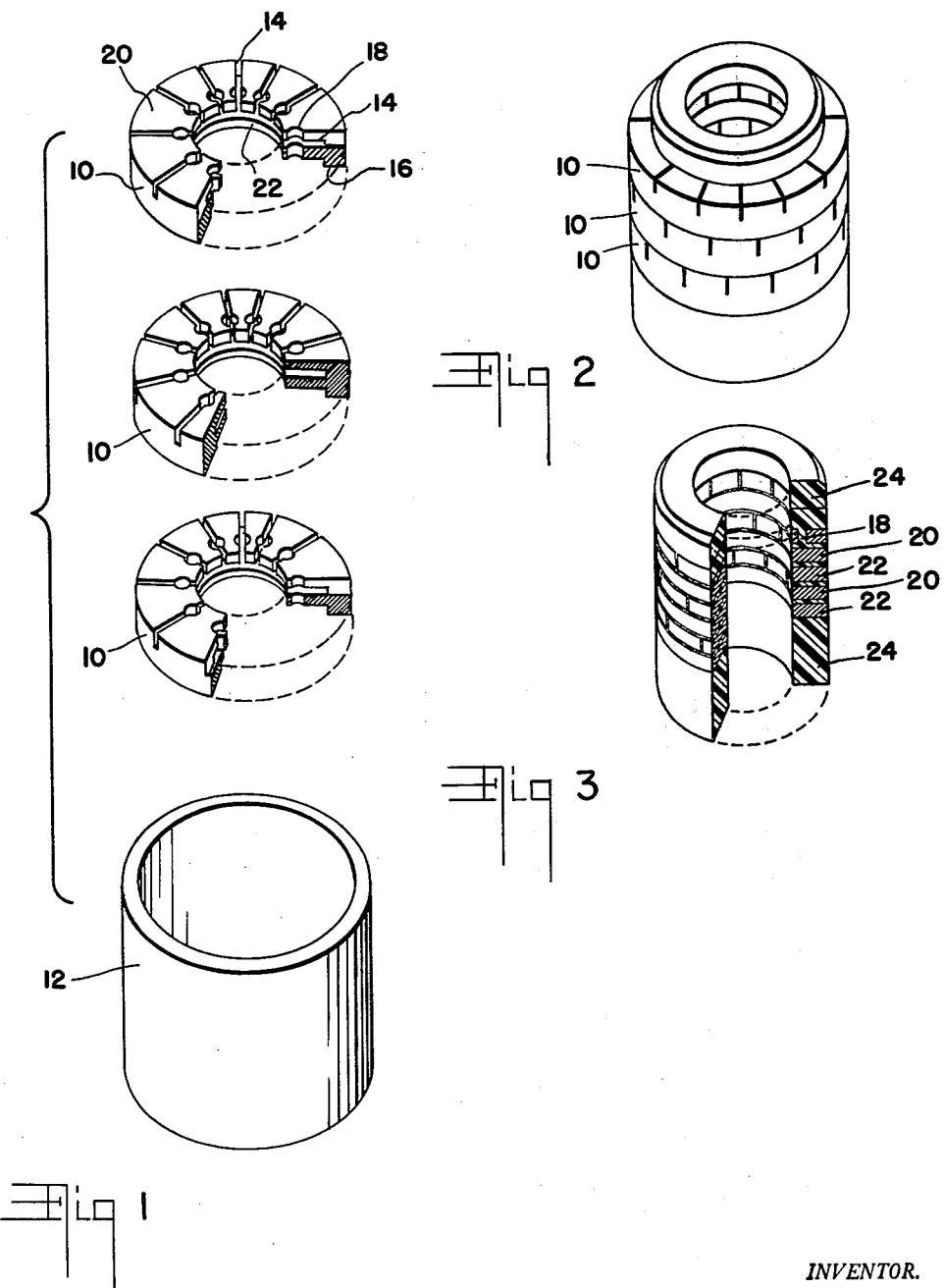

3,118,037
COMMUTATOR CONSTRUCTION
Larkin B. Scott, Fort Worth, Tex., assignor to The Perkin-Elmer Corporation, Norwalk, Conn., a corporation of New York
Filed Mar. 31, 1959, Ser. No. 803,308
3 Claims. (Cl. 200—166)

This invention relates to electrical apparatus and, more specifically, to electrical apparatus comprising electrically conductive segments separated from one another by insulating material.

Many electrical circuits require components which consist of electrically conductive elements separated by insulating materials. This is particularly true of electrical switching apparatus of various types such as motor commutators and various other commutating and circuit switching devices. With increased requirements for miniaturization of parts, many problems have arisen with respect to the manufacturing of such devices. It has been necessary in the past, for example, to manufacture such small switching devices either by the use of hand labor or by complex machine operations. It has been a widespread practice to employ workers to hand assemble small electrically conductive segments and various solid insulating materials such as mica and plastics into articles of the required structure. It will be readily understood that these methods are both expensive and time-consuming and great advances in the electrical manufacturing field could be achieved by the employment of an improved method of manufacturing such articles. It is, therefore, the primary object of the present invention to provide such a method for the manufacture of electrical apparatus. Other objects, features and advantages of the present invention will be apparent from the following description, the appended claims, and the attached drawing.

The above objectives are achieved by a method of manufacturing electrical apparatus which comprises providing at least one electrically conductive means having therein interstices extending partially therethrough. The interstices are filled with an electrically insulating material having liquid properties during said filling. The electrical insulation is then hardened within said interstices and a portion of the electrically conductive means is then removed to form a solid object comprising electrically conductive segments separated from one another by the solid insulating material.

In the drawings:

FIG. 1 is an exploded, partially sectionalized view illustrating the manner in which electrically conductive segments are prepared and combined as the first step in the method of this invention;

FIG. 2 is a three-dimensional view of an incomplete object as produced by an intermediate step of the method of this invention;

FIG. 3 is a sectionalized view of the completed object after the final operations have been performed upon the apparatus of FIG. 2.

The following description and the attached figures refer particularly to a method of manufacturing an improved switching means for use in an apparatus of the type disclosed in my United States Patent 2,843,822 of July 15, 1958, entitled Precision Transducer. In attempting to miniaturize the apparatus shown therein, it was decided to employ a cylindrical-shaped commutator rather than the three arcuate segments 40, tongues 41, and terminals 35 shown therein.

FIG. 1 of the attached drawing shows three identical electrically conductive elements 10 which are stacked together and inserted into a suitable container 12. Each of elements 10 is characterized by the fact that it contains interstices 14 which extend partially through the element in various directions, so as to form wedge-shaped elements 20 partially separated from a single disc-like element 22.

Each of elements 10 also has a shoulder 16 upon that external face which contacts an adjoining element. Vertical holes 18 are provided for imparting strength to the final object as will be apparent later in the description. Elements 10 are stacked, in the manner shown, in container 12. A suitable molten insulating compound is then poured into the central hole so as to completely fill all the various interstices of elements 10, as well as the central hole. The insulating compound employed for this purpose may be any one of a number of suitable types which is capable of being poured in a molten state and of being hardened into a solid. While in its molten state the compound must also be capable of permeating the interstices of the elements to the extent necessary for providing the desired insulation. In the particular apparatus shown herein a general purpose phenolic resin has been found highly desirable from both mechanical and electrical viewpoints. After the insulating material has hardened, the resulting solid object is removed from container 12, and the center hole is drilled to remove unwanted resin therein. The resulting object is shown in FIG. 2. The object of FIG. 2 is then placed on a lathe and the outer surface, including shoulder 16, is removed so that the resulting finished object of FIG. 3 is obtained. Since the common supporting material formerly existing between elements 20 and 22 has now been removed, the apparatus of FIG. 3 will be seen to comprise a solid structure of electrically conductive disc-like elements 22, completely separated from each of a number of small isolated wedge-shaped elements 20 by a suitable solid insulating material 24. It will also be seen that each of holes 18 is now completely filled with insulating compound 24 to assist in maintaining the small wedge-shaped elements 20 in their proper position within the finished article. Electrical connections may now be made to each of the electrically conductive segments 20 and 22 in any desired manner. For example, wires may be soldered directly thereto, or the cutting operation which produces the device of FIG. 3 from the device of FIG. 2 may be so conducted as to leave terminal lugs upon each segment. By inserting a desired bridging apparatus either within or without the completed cylinder, switching operations may be completed between any of wedge-shaped elements 20 and disc elements 22.

It is to be understood that although the above invention has been described with particular reference to a method of manufacturing a particular switching apparatus, the invention is not so limited. For example, the method of this invention may be employed to produce switching apparatus of many different types, including commutators of small motors or generators. Furthermore, the invention is not limited to the use of a particular insulating material. The only critical limitation is that the insulating material must be capable of entering the interstices of the device to the desired extent, and must then solidify to the point where it may be readily removed by a cutting operation.

I claim:

1. The method of manufacturing electrical apparatus which comprises stacking in cylindrical relationship a plurality of electrically conductive disc-like elements each having a central hole therein partially separated from each other by circumferential extensions thereon and characterized by having interstices extending partially therethrough; placing said plurality of conductive elements in a suitable cylindrical container; filling said container and each of the openings in and between said electrically conductive elements with a resin having liquid properties during said filling and being substantially electrically insulating upon hardening; hardening said resin within said interstices and between said electrically conductive elements; separating the solid cylindrical article so formed from said container; removing the central core and a portion of the external surface of said cylinder to form a hollow cylindrical object comprising electrically conductive segments separated from one another by solid resin.

2. An article of manufacture comprising a unitary circular washer-like electrically conductive first element having a circular slot extending from the inner surface thereof normal to the principal axis thereof and a plurality of radial slots extending from one plane surface thereof communicating with said circular slot and a unitary electrically insulating second element comprising a washer-like sheet having on at least one plane surface thereof radial projections in planes normal to said surface, said second element substantially filling the slots of said first element.

3. An article of manufacture comprising a plurality of unitary circular washer-like electrically conductive first elements in stacking relationship, each of said first elements having a circular slot extending from the inner surface thereof normal to the principal axis thereof, a plurality of radial slots extending from one plane surface thereof and communicating with said circular slot, and a circumferential shoulder on at least one plane surface thereof in contacting separating relationship with an adjoining element; and a plurality of unitary electrically insulating second elements, each of said second elements comprising at least one washer-like sheet having on at least one plane surface thereof radial projections in planes normal to said surface, said second elements substantially filling the slots of said first elements and the spaces therebetween formed by said contacting shoulders.

References Cited in the file of this patent
UNITED STATES PATENTS

| | | |
|---|---|---|
| 1,019,166 | Lorimer | Mar. 5, 1912 |
| 1,432,038 | Russell | Oct. 17, 1922 |
| 2,348,511 | Armel | May 9, 1944 |
| 2,455,864 | Hanna | Dec. 7, 1948 |
| 2,651,834 | Klym | Sept. 15, 1953 |
| 2,674,784 | Roberts et al. | Apr. 13, 1954 |
| 2,838,703 | Balke | June 10, 1958 |